United States Patent [19]

Shrim

[11] Patent Number: 5,424,143

[45] Date of Patent: Jun. 13, 1995

[54] AIR-COOLED, METAL-AIR BATTERY

[75] Inventor: Yaron Shrim, Jerusalem, Israel

[73] Assignee: Electric Fuel (E.F.L.) Limited, Jerusalem, Israel

[21] Appl. No.: 307,506

[22] Filed: Sep. 16, 1994

[51] Int. Cl.$^6$ .............................................. H01M 8/04
[52] U.S. Cl. ........................................ 429/26; 429/27; 429/34
[58] Field of Search ........................ 429/26, 27, 34, 38, 429/39, 120; 165/173, 174

[56] References Cited

U.S. PATENT DOCUMENTS

| | | | |
|---|---|---|---|
| 4,489,142 | 12/1984 | Chi et al. | 429/26 |
| 4,508,793 | 4/1985 | Kumata et al. | 429/26 |
| 4,925,744 | 5/1990 | Niksa et al. | 429/27 |
| 4,956,245 | 9/1990 | Shimiza et al. | 429/26 |

Primary Examiner—Anthony Skapars

[57] ABSTRACT

The invention provides a mechanically rechargeable, electrochemical metal-air battery of the type having a plurality of metal-air cells, each of the cells comprising a housing having a base, two major surfaces and two minor surfaces, defining an interior space for containing therein a metal electrode, the electrode having an electrically conductive skeletal member encompassed by a rigid static bed of active anode material and the skeletal member including a heat-conductive, plate-like portion extending above the bed of anode material. The battery further comprises air flow directing means positioned adjacent to the extending plate-like portion, for directing a flow of air towards the surfaces of the plate for the removal of heat therefrom by forced convection.

11 Claims, 3 Drawing Sheets

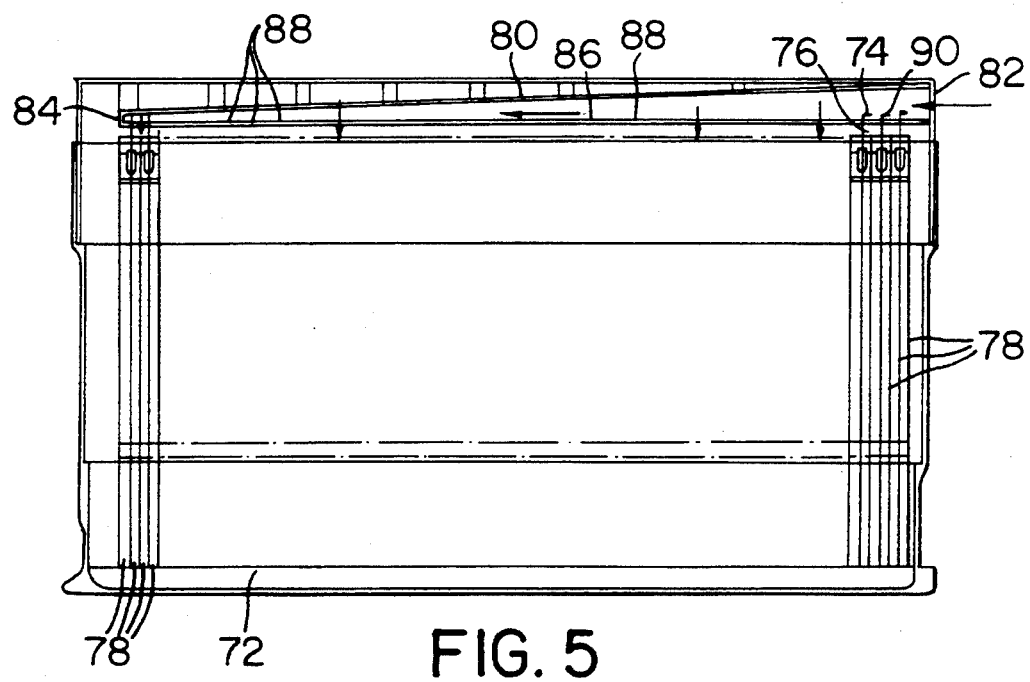
FIG. 5
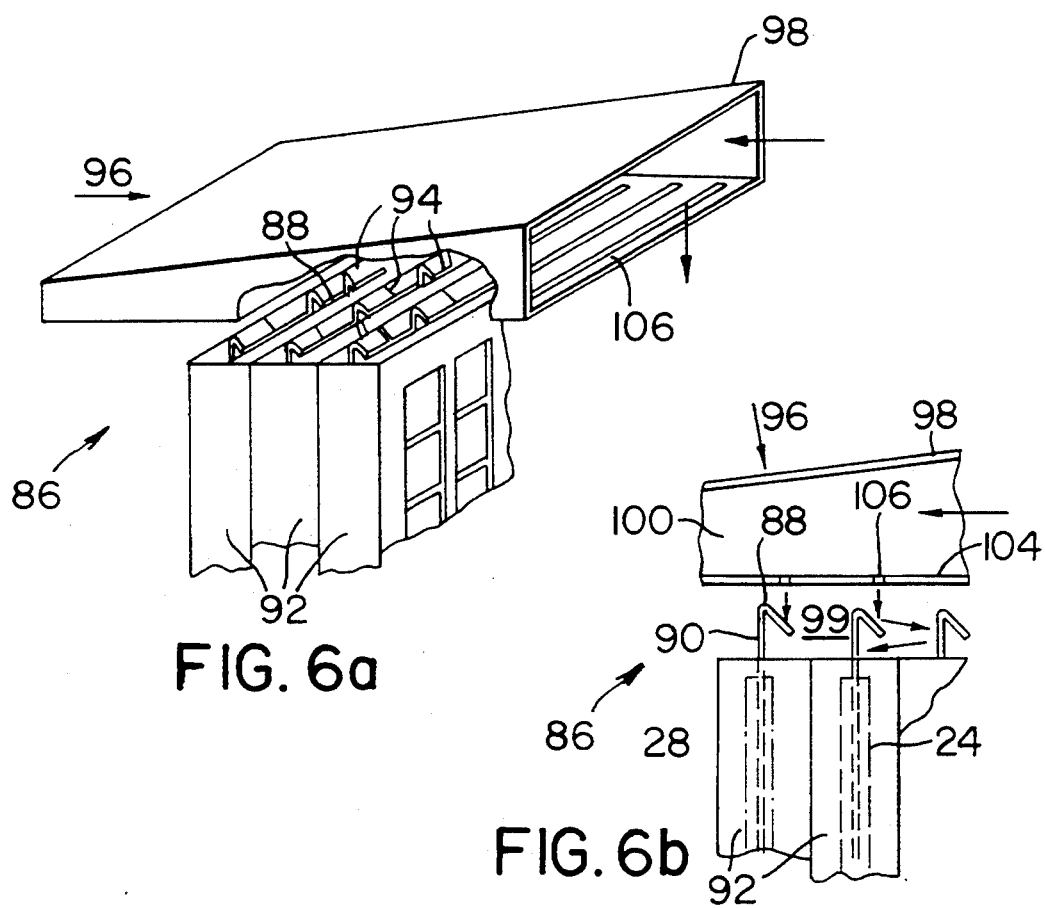
FIG. 6a
FIG. 6b

AIR-COOLED, METAL-AIR BATTERY

The present invention relates to a cooled metal-air battery.

More particularly, the invention provides a reliable air-cooling device suitable for use in a mechanically rechargeable metal-air battery intended for vehicle propulsion.

All electric batteries generate heat during operation, one source thereof being the chemical reaction taking place in the cells, and the second source being the current flow meeting the ohmic resistance of the battery itself. In most batteries, such heat is dissipated naturally, mainly by convection. However, batteries designed to power electric vehicles are designed to provide high power from a compact battery envelope, and may exhibit a high temperature rise if no additional provision is made for cooling. Further aggravating the problem is the consideration that road vehicles need to be designed to allow operation in ambient temperatures as high as 45°–50° C.; under such conditions, the generated heat may raise battery temperature to a level causing battery damage.

While a high operating temperature is not necessarily detrimental to battery performance, there are several reasons justifying some cooling arrangement in a battery of this type. First, in a naturally cooled battery, the inner cells will operate at a considerably higher temperature than those on the battery perimeter, leading to operating differentials between the cells. Second, it is often advantageous to use the heat removed from the battery for heating the passenger compartment of the vehicle, when required.

Cooling systems for electric batteries are described in U.S. Pat. Nos. 754,969; 3,767,468; 4,007,315; 4,463,064; 4,578,324; and 5,212,024. These specifications disclose various systems for circulating a cooling gas such as air, or a liquid such as water, through the battery for removing heat therefrom.

Metal-air batteries contain an electrolyte in liquid form. Such batteries can be cooled by circulating this electrolyte through some form of cooling system. Systems cooling the electrolyte are described in U.S. Pat. Nos. 3,290,176 and 5,093,123. While such systems have certain advantages, particularly in achieving electrolyte mixing to even out concentration differences, these systems require pumping means, radiators and fans, and are more complex than systems using direct air cooling.

It is therefore one of the objectives of the present invention to provide a metal-air battery provided with a simple, efficient and inherently reliable forced-air cooling system.

The present invention achieves said objective by providing a mechanically rechargeable, electrochemical metal-air battery of the type having a plurality of metal-air cells, each of said cells comprising a housing having a base, two major surfaces and two minor surfaces, defining an interior space for containing therein a metal electrode, having an electrically conductive skeletal member encompassed by a rigid static bed of active anode material, said skeletal member including a heat-conductive, plate-like portion extending above said bed of anode material; said battery further comprising air flow directing means positioned adjacent to said extending plate-like portion, for directing a flow of air towards at least one of the surfaces of said plate for the removal of heat therefrom by forced convection.

In a preferred embodiment of the present invention, there is provided a metal-air battery as described above, wherein said metal plate is curled or bent downwards along its upper edge.

In a most preferred embodiment of the present invention, there is provided a metal-air battery wherein said air flow directing means includes a manifold positioned along an upper volume of said battery, with air outlets positioned adjacent to each cell. An upper edge of said metal plate is provided with a series of spaced-apart, downwardly-bent portions. Said air flow directing means are positioned above said metal plate for directing an air flow towards said downwardly-bent portions and through the space therebetween. Advantageously, the air flow directing means includes a manifold duct positioned above a series of juxtaposed metal-air cells, a bottom surface of said duct being provided with a plurality of slits, each slit being aligned with a metal plate of said cell, for directing said air flow at and around said downwardly-bent portion and through the spaces between said portions, for further cooling of the plate surface.

In U.S. Pat. No. 4,925,744, there is described and claimed an aluminum-air battery provided with means for admitting additional electrolyte into the cell from a reservoir positioned above the cell. Provision is made for extending the aluminum anode plate beyond one side of the cell for cooling by natural or forced convection. As hot gases rise, any hot article can best be air cooled by extracting heat from an upper surface. However, in said U.S. patent, this is not feasible since the upper surface of the cell is occupied by the reservoir. Consequently, heat has to be removed in a less-effective manner, by means of a provided side extension.

It is to be noted that the device of the present invention will function to partially cool the battery by natural convection, even in the unlikely case of some failure in the means provided for directing a flow of air along the plates projecting above the cells.

In combination with the absence of moving parts, such a system gives high reliability, making it suitable for use in a battery intended for road vehicle propulsion.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a side elevational view of an embodiment wherein part of the air flows in a downward direction;

FIG. 6A is a detailed perspective view of a most preferred embodiment of the metal plate and air flow means; and FIG. 6B is a further detailed view of the same embodiment.

Figure 1:
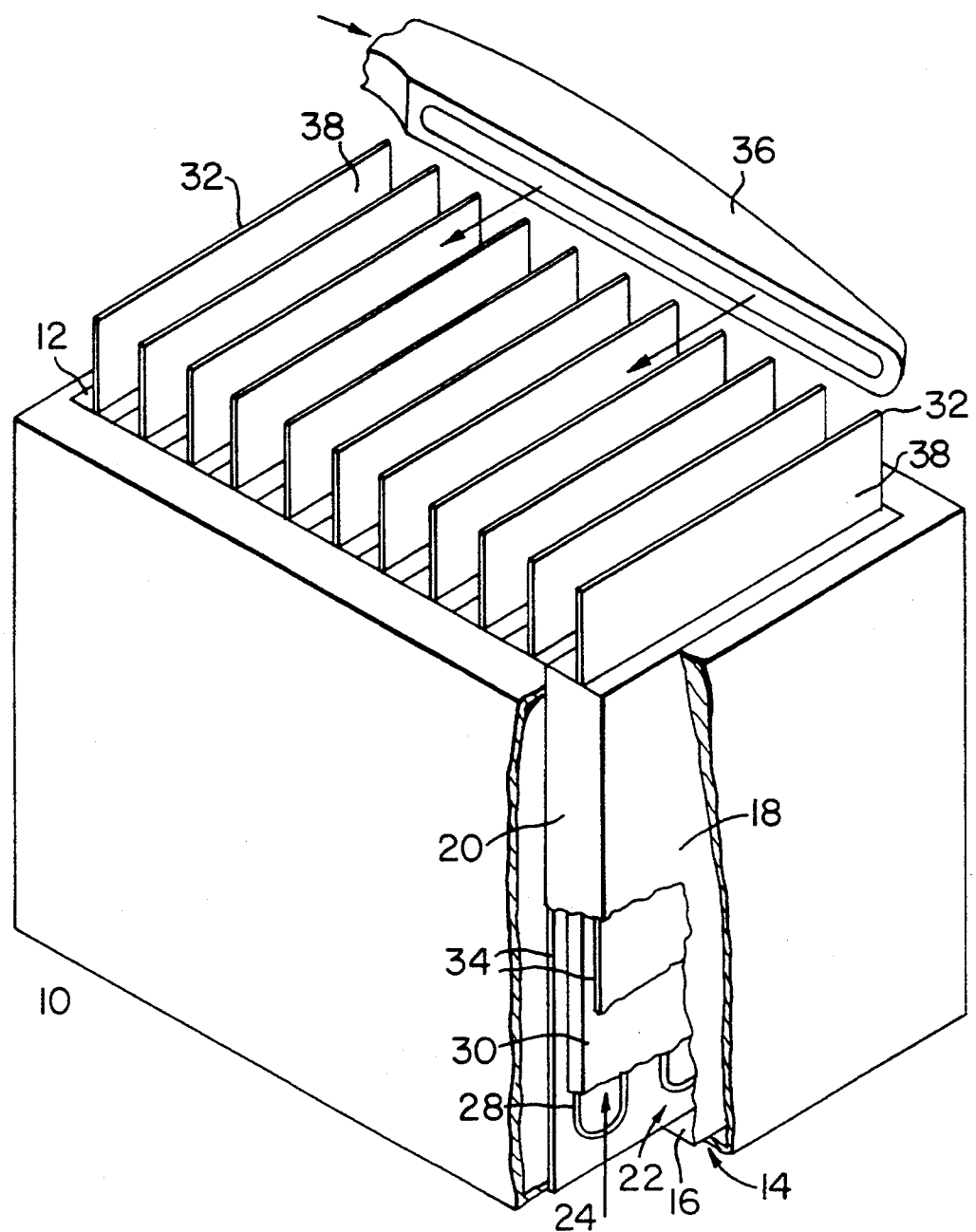
FIG. 1 is a perspective, fragmented view of a preferred embodiment of the cooled battery according to the invention.

There is seen in FIG. 1 a mechanically rechargeable, electrochemical metal-air battery battery 10 of the type having a plurality of metal-air cells 12. Each cell 12 comprises a housing 14 having a base 16, two major surfaces 18 and two minor surfaces 20, defining an interior space 22. Contained therein is the anode 24, which is a metal electrode having an electrically conductive skeletal member 28 encompassed by a rigid, static bed of active anode material 30. The skeletal member 28 includes a heat-conductive, plate-like portion 32 extending above the bed of replaceable anode material 34. Advantageously, portion 32 is an integral extension of the skeletal member 28.

When metal plate portion 32 is made of copper, high heat conductivity is achieved, thus improving cooling efficiency. Copper will be exposed to the KOH vapour atmosphere found within battery 10, and corrosion resistance can be improved by metal plating, for example, with nickel, silver or iridium.

Battery 10 further comprises air flow directing means 36 positioned adjacent to the extending plate-like portions 32, for directing a flow of air in a direction parallel to the major faces 38 of the plate 32 for the removal of heat therefrom by fored convection.

Figure 2:
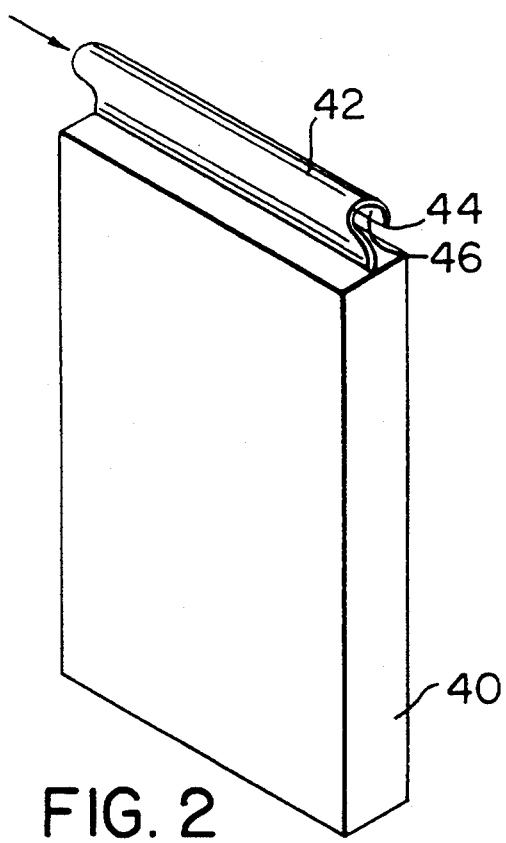
FIG. 2 is a perspective view of a second, preferred embodiment of one of the battery cells.

Referring now to FIG. 2, there is seen a single cell 40 removed from a metal-air battery. The metal plate 42 projecting above the cell 40 is curled downwards along its upper edge 44 to form an open air flow conduit 46. The conduit 46 retains most of the cool air moving in horizontal flow, thus improving conductive heat transfer. In comparison with the flat plate portion 32, less cooling air is required to achieve the removal of an equal quantity of heat from plate 42.

Figure 3:
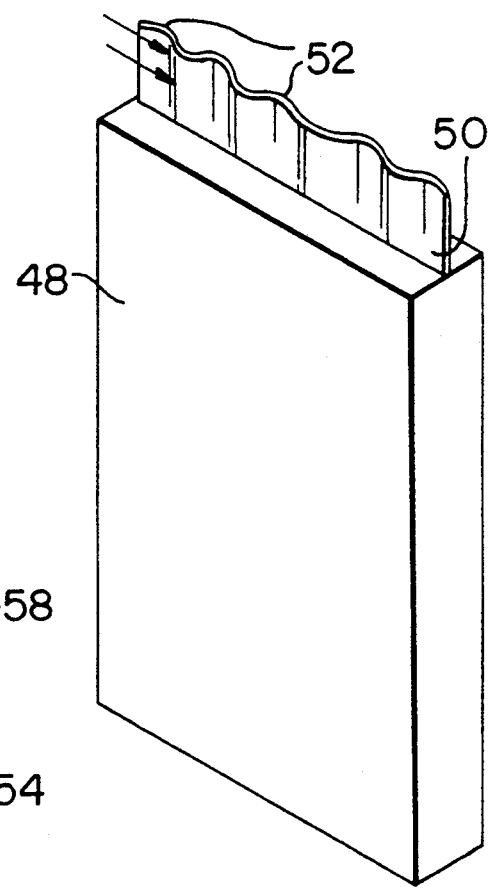
FIG. 3 is a perspective view of a third embodiment of one of the battery cells.

FIG. 3 also shows a single cell 48, removed from a metal-air battery. A metal plate 50, projecting above cell 48, is provided with corrugations 52 which are vertically oriented, while air blown horizontally across the corregations 52 moves in turbulent flow. Consequently, less cooling air is required, due to the resultant higher heat-transfer coefficient achieved.

Figure 4:
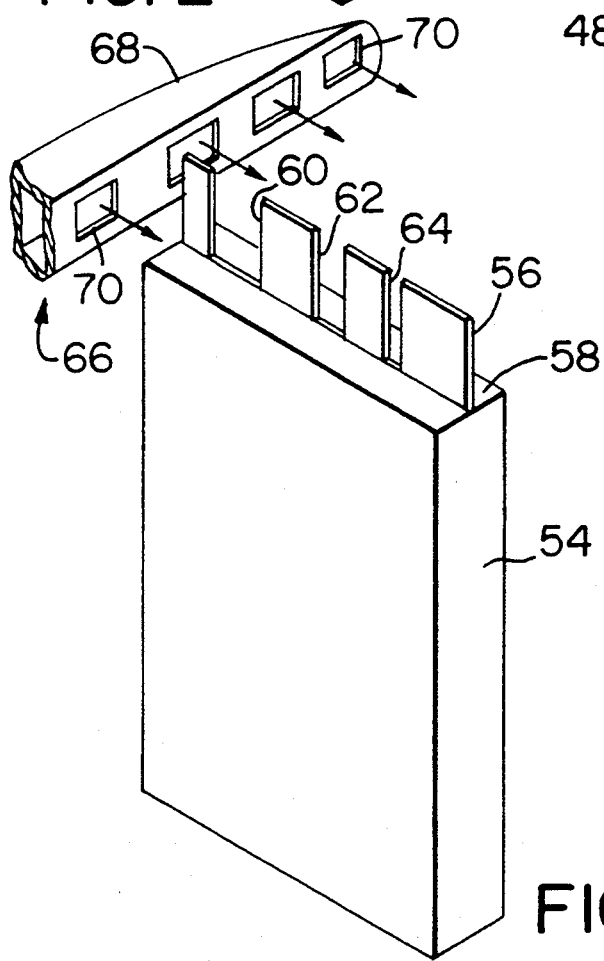
FIG. 4 is a perspective view of a fourth embodiment of one of the battery cells, positioned to receive an air flow from a manifold.

FIG. 4 shows a single cell 54, removed from a metal-air battery. An upper metal plate 56 projecting from the upper cell surface 58 is provided with a number of slits 60, 62, 64. The slit 60, closest to the air flow directing means 66, is wider than the slit 64 located farther therefrom. The slits 60, 62, 64 serve to even out the temperature gradients across the width of the cell 54. Where the air flow is stronger near the means 66, the wider slit 60 reduces the heat conduction area of the plate 56. Furthest from the means 66, where air flow is weaker and the air has already absorbed some heat from traversing part of plate 56, the slit 64 is narrow so as to only slightly reduce the heat conduction area of plate 56.

The air flow directing means 66 includes a manifold 68, positioned along an upper corner of the battery shown in FIG. 1, with air outlets 70 positioned adjacent to each cell 54.

FIG. 5 depicts a metal-air battery 72, wherein cooling air flow directing means 74 includes a manifold 76 positioned along an upper volume of battery 72. Air outlets 80 are positioned adjacent to each cell 78. Air is blown into the wider inlet end 82 towards the narrower end 84, so as to facilitate equal flow distribution among the outlets 80.

Seen in FIGS. 6A and 6B is a detail of a particularly preferred embodiment of a metal-air battery 86. An upper edge 88 of metal plate 90 projecting above cell 92 is provided with a series of spaced-apart, downwardly-bent portions 94. Air flow directing means 96, including the manifold 98, are positioned above the metal plate 90 for directing an air flow towards the downwardly bent portions 94 and through the space 99 between adjacent plates 90. The plate 90 forms an upper extension to the skeletal frame 28 of anode 24.

Air flow directing means 96 includes a manifold duct 100 positioned above a series of juxtaposed metal-air cells 92. A bottom surface 104 of duct 100 is provided with a plurality of slits 106, each slit 106 being aligned with a metal plate 90 of a cell 102.

In operation, an air flow is directed around the downwardly-bent portion 94 and through spaces 99 for further cooling of the surface of the plate 90, which extracts unwanted heat from the anode 24. High cooling efficiency is achieved by impacting the air flow first with the outer part of the bent portions 94 and then with the inner faces thereof, as shown in FIG. 6B.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A mechanically rechargeable, electrochemical metal-air battery of the type having a plurality of metal-air cells, each of said cells comprising:

a housing having a base, two major surfaces and two minor surfaces, defining an interior space for containing therein a metal electrode, said electrode having an electrically conductive skeletal member encompassed by a rigid static bed of active anode material, said skeletal member including a heat-conductive, plate-like portion extending above said bed of anode material;

said battery further comprising air flow directing means positioned adjacent to said extending plate-like portion, for directing a flow of air towards the surfaces of said plate for the removal of heat therefrom by forced convection.

2. A metal-air battery as claimed in claim 1, wherein said metal plate is an integral extension of said skeletal member.

3. A metal-air battery as claimed in claim 1, wherein said metal plate is curled downwards along its upper edge.

4. A metal-air battery as claimed in claim 1, wherein said metal plate is made of copper.

5. A metal-air battery as claimed in claim 4, wherein said copper plate is plated with a metal selected from the group comprising nickel, silver, and iridium.

6. A metal-air battery as claimed in claim 1, wherein said metal plate is provided with corrugations.

7. A metal-air battery as claimed in claim 1, wherein said metal plate is provided with a number of slits, said slits near said air flow directing means being wider than said slits located further therefrom.

8. A metal-air battery as claimed in claim 1, wherein said air flow directing means includes a manifold positioned along an upper volume of said battery, with air outlets positioned adjacent to each cell.

9. A metal-air battery as claimed in claim 1, wherein an upper edge of said metal plate is provided with a series of spaced-apart, downwardly-bent portions.

10. A metal-air battery as claimed in claim 9, wherein said air flow directing means is positioned above said metal plate for directing an air flow towards said downwardly-bent portions and through the space therebetween.

11. A metal-air battery as claimed in claim 10, wherein said air flow directing means includes a manifold duct positioned above a series of juxtaposed metal-air cells, a bottom surface of said duct being provided with a plurality of slits, each slit being aligned with a metal plate of said cell, for directing said air flow at and around said downwardly-bent portion and through the spaces between said portions, for further cooling of the plate surface.

* * * * *